United States Patent

[11] 3,557,863

| [72] | Inventor | Rudolf Becker<br>Munich, Germany |
|---|---|---|
| [21] | Appl. No. | 715,887 |
| [22] | Filed | Mar. 25, 1968 |
| [45] | Patented | Jan. 26, 1971 |
| [73] | Assignee | Linde Aktiengesellschaft<br>Hollriegelskreuth, Germany |
| [32] | Priority | Apr. 26, 1967 |
| [33] | | Germany |
| [31] | | 53360 |

[54] PROCESS AND APPARATUS FOR OBTAINING FRESH WATER FROM SALINE WATER
42 Claims, 5 Drawing Figs.

[52] U.S. Cl................................................. 159/4,
159/16, 159/47, 159/24, 159/48; 202/197; 203/11,
203/49
[51] Int. Cl........................................................ B01d 1/06,
B01d 1/12, B01d 1/16
[50] Field of Search........,..................................... 159/4A,
16A, (Critical), (Radioactive), 47, 47(WL), 24,
24(I), 48, 31; 60/64; 203/49, 10, 11, (Power Gen.);
202/197, 199, (SWC)

[56] References Cited
UNITED STATES PATENTS

| 3,147,598 | 9/1964 | Wilson | 60/64 |
| 3,215,189 | 11/1965 | Bauer | 159/16A |
| 3,285,834 | 11/1966 | Guerrieri | 159/16A |
| 3,336,207 | 8/1967 | Peterson | 202/236 |
| 3,351,537 | 11/1967 | Peterson | 203/49X |
| 3,323,575 | 6/1967 | Greenfield | 159/24IX |

*Primary Examiner*—Norman Yudkoff
*Assistant Examiner*—J. Sofer
*Attorney*—Millen, Raptes & White

ABSTRACT: For extracting fresh water from saline water, saline water is injected into a hot, high-pressure gaseous stream directed into an evaporation chamber from which the vapor-gas mixture generated therein is withdrawn from the upper portion, and from a lower portion precipitated salts and mineral constituents are withdrawn in a solid, liquid and/or concentrated dissolved form. The vapor-gas mixture is engine-expanded in at least one stage and a fresh water condensate is extracted therefrom by cooling.

INVENTOR
RUDOLF BECKER
BY J. William Miller
ATTORNEY

INVENTOR
RUDOLF BECKER
BY I. William Miller
ATTORNEY

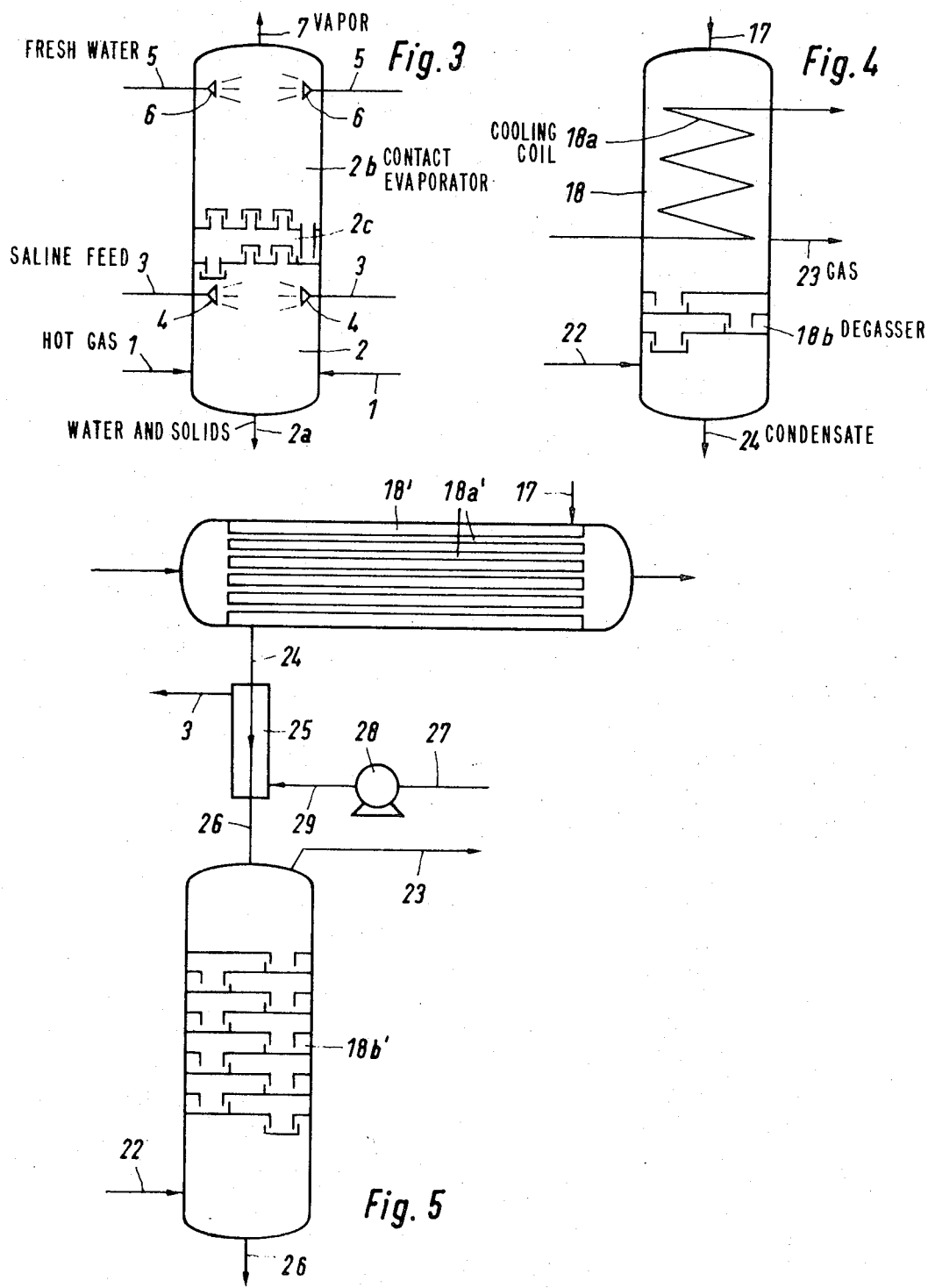

PROCESS AND APPARATUS FOR OBTAINING FRESH WATER FROM SALINE WATER

BACKGROUND OF THE INVENTION

This invention relates to a process and apparatus for obtaining fresh water from saline water and more particularly to such a process wherein fresh water is extracted by evaporation.

Processes for the production of fresh water from saline water based on a multistage evaporation, e.g., by expansion, are known in the prior art. These processes are utilized in order to operate at as low an energy requirement as possible and, if possible, to avoid heated metallic surfaces.

SUMMARY OF THE INVENTION

In contradistinction to prior art evaporative processes, the present invention has as an object the minimization of the number of stages required in a saline water evaporation process and further of reducing the expense of manufacturing fresh water by producing byproducts which may be utilized in the processing plant.

According to a preferred embodiment, these objects are achieved by introducing saline water through a nozzle into a hot, high-pressure gaseous stream and then directing the mixture into an evaporation chamber. A vapor-gas mixture is withdrawn from an upper section of the evaporation chamber and the precipitated salts and mineral components are removed partially in the liquid, partially in the solid phase and/or partly dissolved and concentrated in water from a lower section of the evaporation chamber. The gas-vapor mixture is engine-expanded in one or more stages (the term "engine-expansion" meaning expansion with the production of external work), and finally fresh water is condensed out of the mixture by cooling. This expansion can suitably be accomplished through turbines and in this connection, it is advantageous to superheat the gas-vapor mixture prior to at least one of the expansion stages.

By this process, energy is produced as a byproduct by the expansion of the gas-vapor mixture gained without the use of heated metallic heat exchange surfaces. The value of the energy produced as a result of the process serves to reduce the expense of the manufacture of the fresh water in accordance with the invention.

According to a further feature of the invention, the gas-vapor mixture rising in the evaporation chamber is subjected to a fresh water post-washing step in order to remove salt particles entrained in the mixture. Advantageously, the washing water employed is the vapor condensate from a first engine expansion stage which may still contain some salt.

Furthermore, it has been found to be advantageous to utilize one of the latter condensation stages of the gas-vapor mixture for removing $SO_2$ and/or $CO_2$ as will be described in greater detail hereinafter.

These and other objects of the invention will become better understood to those skilled in the art by reference to the following detailed description when viewed in light of the accompanying drawings wherein like numerals throughout the figures thereof indicate like components and wherein:

BRIEF DESCRIPTION OF THE DRAWINGS

FIG. 3 is a schematic view of an apparatus with two evaporated chambers;

FIG. 4 is a schematic view of a condenser with a degassing-improving structure; and FIG. 5 is a schematic view of a condenser with separate degassing column.

Figure 1:
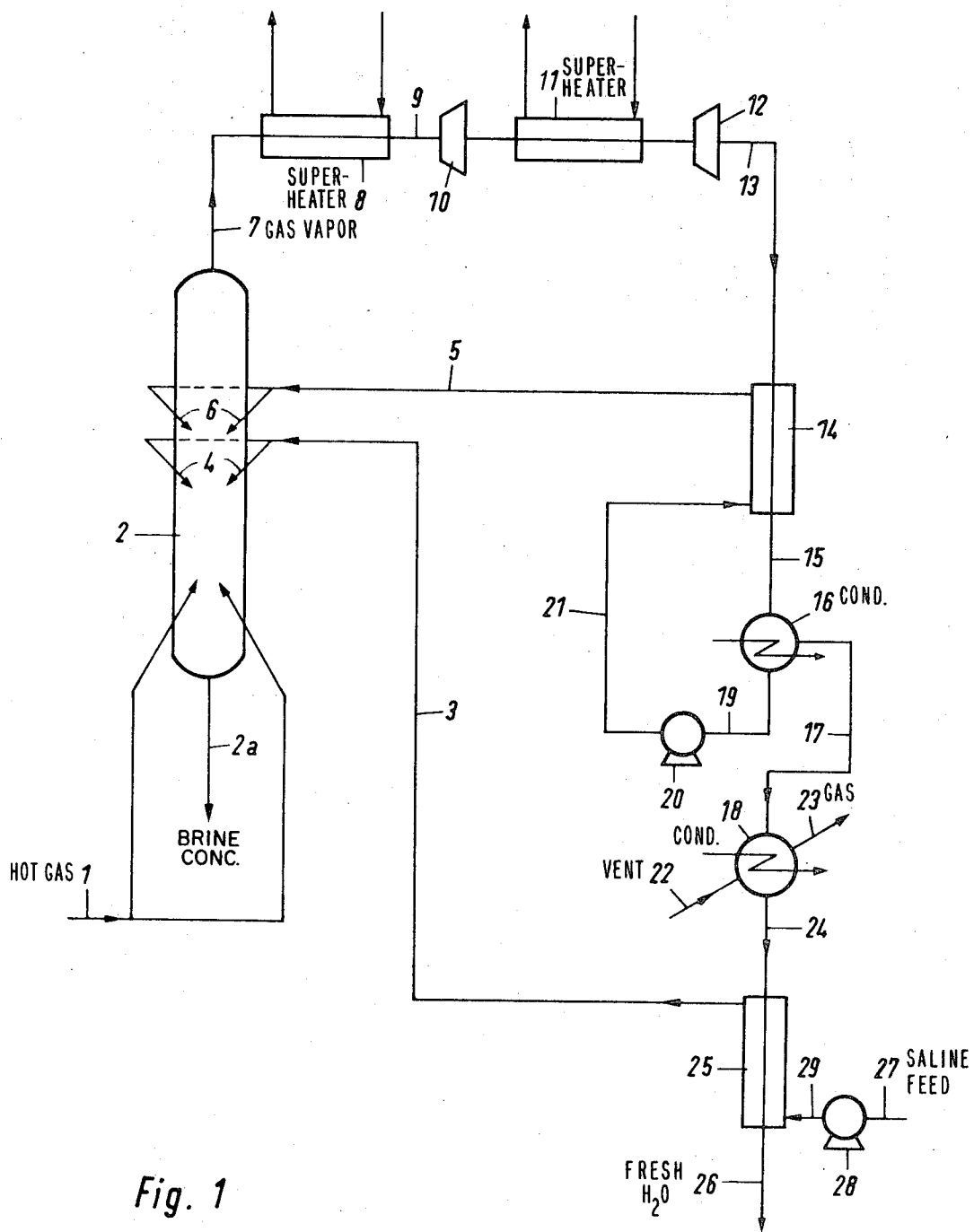
FIG. 1 is a schematic view of an apparatus in accordance with the invention.

According to FIG. 1, a hot gaseous stream is introduced at a high pressure into a conduit system 1 and from there laterally into the lower section of an evaporation chamber 2.

The hot gaseous stream can consist, in this connection, of combustion gases of the pressurized firing of oils, gases, or solid fuels, cycle cooling gas of an atomic reactor, a component of the cycle of a gas turbine plant, or the exhaust gasses of an open gas turbine.

In the event that combustion gases are utilized, it is advantageous to conduct the combustion of the fuels employed in a chamber separate from the evaporation chamber of this apparatus and then transfer the gases under a high pressure into the evaporation chamber. A quantity of preheated saline water is introduced into the evaporation chamber 2 through a conduit 3 by way of nozzles 4.

It is advantageous according to this invention to maintain a high temperature in the evaporation chamber by introducing the water through the nozzles at a moderate rate.

The flow rate of the sea water is so chosen that the water is vaporized entirely or only a little part of not more than 10 percent of the water remains in liquid form.

Saline water is evaporated in the rising hot gaseous stream, and the salts and mineral components of the saline water are precipitated and removed from the sump by conduit 2a.

Fresh water, which can contain some residual salts, is introduced through a conduit 5 by way of additional nozzles 6, above the nozzles 4, in order to wash any salt particles that may have been entrained in the rising gas-vapor mixture. In order to improve the washing step, rectification plates, other installations, or layers of packing can be provided below the nozzles 6, if so required.

At the uppermost section of the evaporation chamber 2, the gas-vapor mixture is conducted through a conduit 7 to a superheater 8 from where the superheated gas-vapor mixture is conducted, via a conduit 9, to a first turbine stage 10, an intermediate superheater 11, and a second turbine stage 12. The expanded gas-vapor mixture then enters, by way of a conduit 13 and via a heat exchanger 14 and a conduit 15, a first condenser stage 16. The condensate collected at this point is conducted through a conduit 19 via a pump 20 into a conduit 21 by way of the heat exchanger 14 into the above-mentioned conduit 5 and is employed for post-washing the gas-vapor mixture.

The gas-vapor mixture that was not condensed in the condenser 16 is passed via a conduit 17 into a second condenser 18. This condenser 18 is variously illustrated in FIGS. 4 and 5 and more diagrammatically in FIGS. 1 and 2. The condenser 18 is ventilated by a conduit 22 in order to drive off any $SO_2$ and $CO_2$ still present in the condensate. The uncondensed gases then pass to the outside via a conduit 23. The condenser 18, in this connection, can be provided with any desired units for improving the degasification.

The degasification can also be conducted in a degassing column connected downstream of the condenser 18 if so desired. The pure, fresh water condensate is finally passed to the consumer through a conduit 24 by way of a heat exchanger 25 and a conduit 26. The heat exchanger 25 serves to utilize the residual heat of the condensate to preheat the saline water fed via a conduit 27, pump 28, and conduit 29, and subsequently introduced through the above-mentioned conduit 3 to the nozzles 4 of the evaporation chamber 2.

The hot gaseous stream ambient at a high pressure in the conduit system 1 can, as set forth above, stem from a high-pressure combustion chamber connected directly in upstream thereof, which chamber is fired by any desired fuels.

It is also contemplated that the combustion of the utilized fuels can be conducted in the evaporation chamber 2 in which case any slag produced thereby can be eliminated together with the saline water salts in the liquid or solid phase, or slurried up in the residual brine.

If the hot pressurized gaseous stream constitutes the hot cooling gas stream exiting from a reactor, the uncondensed gases emanating from the last condensation stage would have to be recycled into the reactor.

It is contemplated in an advantageous embodiment of the process, that a second evaporation chamber having a controlled water feed can be inserted after the first evaporation chamber; however, as illustrated, the process can be conducted by connecting a superheater after the evaporation chamber if the temperature of the gas-vapor mixture exiting from the evaporation chamber is insufficient.

Heat may be supplied to the superheater 8 from a portion of the gaseous stream either directly or indirectly through a heat transfer medium or from some external source if so desired.

In FIG. 3 an advantageous embodiment of a double evaporation chamber is shown. Here a second evaporation chamber 2b similar as the first chamber 2 is arranged which is equipped with said additional nozzles 6. Both the chambers are separated by a rectification column section 2c—for instance with bubble cap trays—through which the water not evaporated flows down whilst the gases on their way through the bubble caps to the upper evaporation chamber are forced to spray through the water.

The process of the invention finds utility in treating saline water having a wide range of impurities; however, it has been found that the process has particular utility in desalinizing sea water of a dissolved solids content of between 1 and 6 percent.

The configuration and operating parameters of the evaporation chamber 2 will depend on the capacity of the plant and properties of the water to be processed. It has been found, however, that for a plant suitable for processing 100,000 gal./hr. of saline water of an average dissolved solids content of 3.5 percent and ambient temperature of about 300° K., evaporation chambers of between 5,000 and 25,000 ft.$^3$ capacity, operating at a pressure and temperatures of between 20 and 100 atma. and 460 and 550° K. are suitable for the purpose of this invention.

For such a plant, having an evaporator of 10,000 ft.$^3$, for example, inlet gas temperatures of between 1,000 and 3,000° K. at pressures of between 20 and 100 atma. and flow rates of between 500,000 and 1,000,000 Nm.$^3$/h., are suitable. Fresh water can be supplied to the evaporation chamber at rates ranging from 4,000 to 8,000 gal./hr. to suitably remove entrained solids from the gas-vapor product.

Through conduit 2a excess water and solid constituents are withdrawn.

It should be understood that the ranges discussed above are, for the most part, interdependent on one another as indicated and to some extend dependent on external parameters and conditions. Other variations in these ranges as well as variations in the optimum operating parameters exceeding those specifically described may therefore be found suitable without exceeding the scope of this invention.

The following example is intended to illustrate a preferred set of operating parameters for a specific plant treating a specific saline water in order to more clearly describe the operation of the invention.

EXAMPLE

With a pressure and temperature of 40 atma. and 500° K. maintained in an evaporation chamber having an internal volume of 8,000 ft.$^3$, 100,000 gal./hr. of saline water having an average dissolved solids content of 3.5 percent are introduced into the chamber through the nozzles 4 along with 260,000 Nm.$^3$/h. of gas at 3,000° K. and 40 atma. through the conduit system 1. Fresh water having a dissolved solids content or less than 1,000 p.p.m. is supplied to the chamber through nozzles 6 at a rate of 5,000 gal./hr. The gas-vapor mixture exits the chamber through the conduit 7 at a rate of 710,000 Nm.$^3$/h., a temperature of 500° K. and pressure of 40 atma. The mixture is heated in the superheater 8 to a temperature of 800° K., at a pressure of 40 atma. and is expanded to a pressure of 7 atma. at a temperature of 550° K. through the turbine 10. The expanded mixture is brought to a temperature of 800° K. at a pressure of 7 atma. in the second superheater 11 whereupon it is expanded through the turbine 12 to a pressure of 1.2 atma. and temperature of 540° K. The fluid is cooled to a temperature of 360° K. in the heat exchanger 14 and is condensed out in the first stage condenser 16 with a 5,000 gal./hr. of condensate drawn off from the condenser through the conduit 19 and 685,000 Nm.$^3$/h. of uncondensed gas-vapor mixture exiting through the conduit 17 at a pressure of 1.1 atma. and temperature of 360° K. A major portion of the remaining gaseous mixture is condensed in the second condenser 18 and exits at a rate of 90,000 gal./hr. and temperature of 335° K. for final cooling to a temperature of 328° K. in the heat exchanger 25.

The quantity of water lost by way of the conduit 2a is 10,000 gal./hr.

According to a further feature of the invention, it is of particular advantage to utilize the energy produced by engine-expansion of the gas-vapor mixture for driving a compressor for compression of the vapor from a second saline water evaporator which operates at a somewhat higher pressure than that in the hot gas evaporation chamber of the first apparatus, so that the vapor can be reused as heating medium in the first evaporator. In this manner, the energy obtained by the expansion of the gas-vapor mixture is utilized for the evaporation of substantially larger amounts of saline water and thereby produces increased quantities of fresh water.

In this connection, it is advantageous to enrich the saline water with salt before it is introduced through nozzles into the evaporation chamber to which the hot gas stream is supplied under pressure. This enriching step is conducted in the separate saline water evaporator.

Furthermore, it is advantageous in accordance with this invention first to prewarm the saline water by heat exchange with heating vapor condensate from the separate evaporator and with the residual gas-vapor mixture from the first condensation stage of the engine-expanded gas-vapor mixture, the latter having been reheated subsequently by any desired heating medium. This saline water is thereafter introduced in a salt enriched condition into the evaporation chamber of a condenser-evaporator of the separate saline water evaporator with a vapor separator, which latter has the hot gas stream supplied thereto under pressure.

In this respect, it can be advantageous to reevaporate a portion of the hot vapor condensate of the separate saline water evaporator by any desired heating medium and to recycle same into the condenser-evaporator as the heating means. Such secondary evaporator can also be employed for initiating the entire plant operation.

Finally, it can be advantageous to employ a portion of the hot pressurized gaseous stream, in each case for superheating or intermediate superheating of the gas-vapor mixture before its first and second expansion, respectively, and/or for reheating the expanded gas-vapor mixture after the first condensation stage and/or for the reevaporation of a portion of the heating vapor condensate of the separate saline water evaporator for recycling as a heating medium for additional saline water evaporation either directly or by way of a heat transfer means.

If direct heat transfer means are used, it is advantageous to employ the reheated gas-vapor mixture from the first condensation stage as the heat transfer medium between the hot gaseous stream and the heating vapor condensate to be evaporated.

In order to avoid salt incrustations in the separate saline water evaporator and/or on the metallic heat exchange surfaces thereof, it is suitable, in accordance with a further feature of this invention, to add any desired oil having a strong affinity to metallic surfaces, minimum solubility in water, minimum solubilizing power for salts contained in the saline water, and a minimum vapor pressure for the formation of films on the metallic heat exchange surfaces to the saline water before it is heat exchanged with fresh water products.

The oil admixed to the saline water can be eliminated, at least partially, by decanting before the salt enriched saline water is introduced through a nozzle into the evaporating chamber, and can then be recycled into the crude saline water. Furthermore, it is advantageous to subject the oil added to the saline water to a partial or complete afterburning process after having been introduced through nozzles into the hot pressurized gas stream, by providing an appropriate excess of oxygen.

Figure 2:
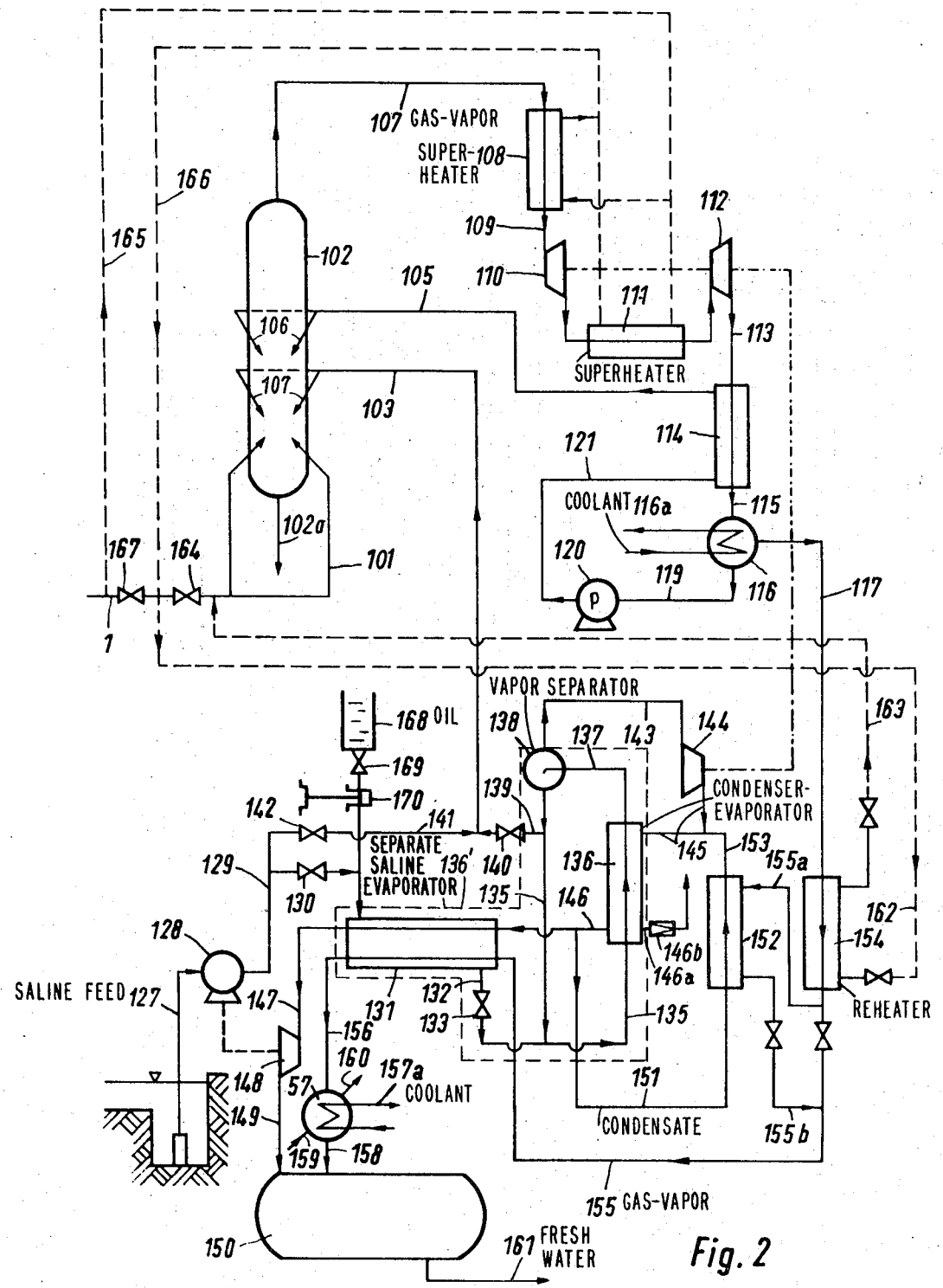
FIG. 2 is a schematic view of another embodiment of the invention illustrating the apparatus of FIG. 1 combined with a separate saline water evaporator.

In this respect, in the process according to FIG. 2, components thereof corresponding to like components of the preceding FIG. are indicated by like numerals only of the next higher order.

The evaporation chamber 102 is combined with a further separate saline water evaporator 136' and a heat pump. The energy produced in the turbine stages 110 and 112 is utilized, at least partially, in this embodiment for driving a vapor compressor 144. The separate saline water evaporator 136' comprises a heat exchanger 131, a condenser-evaporator 136, and a vapor separator 138. The saline water conveyed by the pump 128 then passes through the conduit 129 and valve 130 into the heat exchanger 131. In this heat exchanger, the saline water is brought to approximately the boiling temperature resulting at the ambient pressure at this point, which is somewhat higher, for example, 100 atma. than the pressure in the evaporation chamber 102. The heated saline water passes through a conduit 132 with a valve 133 into an evaporator (cycle) conduit 135. The mixture, enriched in vapor bubbles in the condenser-evaporator 136, passes through a conduit 137 into the separator 138 from which the enriched brine flows into the recycle line 135. A branch-off conduit 139, with a valve 140 is arranged in the cycle line to supply the saline water, enriched in salts, via the conduit 103 and the nozzles 104, to the hot gas evaporation chamber 102.

A conduit 141 for crude saline water, with a valve 142, can be utilized for starting the plant or also for temperature control purposes, if so desired.

The vapors exiting from the vapor separator 138 pass through a conduit 143 to the above-mentioned vapor compressor 144, whereupon the compressed vapors are recycled through a conduit 145 into the condenser section of the condenser-evaporator 136. Uncondensible gases can be exhausted to the outside through a conduit 146a with excess pressure relief valve 146b. Then, the condensate passes through line 146 via the above-mentioned heat exchanger 131 and a conduit 147 to an expansion turbine 148 and from there via a conduit 149 into a fresh water reservoir 150. The expansion turbine 148 can be coupled with the saline water pump 128 mechanically or electrically.

A branched conduit 151 leads from conduit 146 to an additional heater 152 wherein part of the condensate is again evaporated and recycled through a conduit 153 to the conduit 145 for compressed vapors.

The gas-vapor mixture in the conduit 117, which was not condensed in the first condensation stage, passes thereafter to a reheater 154 which can be heated by any desired heating medium. The reheated gas-vapor mixture then passes through a conduit 155 to the above-mentioned heat exchanger 131 and then via a conduit 156 to a final condenser 157. The condensate therefrom passes through a conduit 158 into the above-mentioned fresh water reservoir 150. Here again, the condenser 157 is ventilated by means of a conduit 159 so that any $SO_2$ and $CO_2$ still present in the condensate is simultaneously exhausted through a conduit 160. The fresh water then is conducted from the reservoir 150 through a conduit 161 to the consumer.

As indicated by dashed lines, the reheater 154 for the gas-vapor mixture from the first condensation stage can be heated with a partial stream of the hot pressurized gaseous stream through a conduit 162. The cooled partial stream is then recycled through a conduit 163 into the conduit system 101; for this purpose, a throttle valve 164 is provided in the conduit system.

The superheaters 108 and 111 can likewise be heated, as indicated in dashed lines, by a partial stream of the hot gaseous stream by way of conduits 165 and 166, there being likewise provided an appropriate throttle valve 167 in conduit 101.

In order to avoid incrustation of the heat exchanger 131 and the separate saline water evaporator 136, as was described above, a certain amount of oil is added to the saline water before it enters the system from an oil reservoir 168 with a valve 169, by way of a metering pump 170, so that an oil film is formed on the metallic heat exchange surfaces in order to prevent incrustation. Suitably, a decanting vessel (not shown) can be inserted in the conduit 139, from which vessel the separated oil can be returned into the crude saline water in the conduit 129. The residual oil then passes through the conduit 103 into the evaporation chamber 102, where it can be afterburned by the addition of an appropriate excess of oxygen.

As indicated in FIG. 2, the additional heater 152 can be heated advantageously by a partial stream of the gas-vapor mixture from the first condensation stage, which mixture was heated in the reheater 154, fed and discharged, respectively, via conduits 155a and 155b.

Heat may be supplied to the reheater 154 by a portion of the gaseous stream either directly or indirectly through a heat transfer medium or, as stated above, by any other desired medium.

The condenser stage 18 (FIG. 1) or 157 (FIG. 2) respectively may advantageously be constructed as shown in FIG. 4 or 5.

In FIG. 4 the conduit 17 (156) is connected to the condenser 18 (157). In the head of the condenser a cooling coil 18a (157a) is arranged. Underneath the cooling coil a degassing improving structure 18b—for instance a set of bubble cap trays—is built in.

The conduit 24 (158) leads the condensate to use.

The conduit 22 (159) leads for instance air into the condenser, whilst the conduit 23 (160) is arranged to pass all the uncondensed gases to the outside including $SO_2$ and $CO_2$ driven off by the air passing the bubble cap trays 18b.

According to FIG. 5 after a condenser 18 with cooling coils 18a' and a heat exchanger 25, a separate degassing column 18b' is arranged in the conduit 26 (158) in order to drive off any $SO_2$ and $CO_2$ still present in the condensate, arriving in conduit 26 (158).

Air is passed to the column through the conduit 22 (159) and the uncondensed gases and air loaded with $SO_2$ and $CO_2$ pass to the outside via the upper conduit 23.

The embodiment of FIG. 2 provides primarily an improvement in efficiency of the embodiment of FIG. 1 by combining therewith a more conventional distillation apparatus wherein: (1) the raw feed water is subjected to a first separation step in the heat exchanger 131 and vapor separator 138 prior to evaporation in the chamber 102; (2) the work output of the turbines 110 and 112 is utilized to drive the compressor 144 to recover the vapor fraction from the separator 138; and (3) the last stage of condensation of the embodiment of FIG. 1 is accomplished in the condenser 157 in cooperation with prior heat exchange in the heat exchanger 131 and an additional reheat in the reheater 154 for transfer of heat to the conventional distillation apparatus.

EXAMPLE

Accordingly, assuming the above operational characteristics for the Example given for the embodiment of FIG. 1, an additional output of 90,000 gal./hr. of fresh water through the conduit 149 is realized by heating incoming raw saline water flowing at a rate of 100,000 gal./hr. and supplied at a pressure of 100 atma., to 580° K. in the heat exchanger 131, further warming the stream to 583° K. in the condenser-evaporator 136 and conducting the fluid in the vapor separator 138. From the separator, enriched brine is withdrawn at a rate of 200,000 gal./hr. and temperature of 583° K., which fluid is divided to send 100,000 gal./hr. through the branch-off conduit 139 for transmission to the chamber 102 through the conduit 103 and nozzles 104 and 100,000 gal./hr. through the conduit 135 for recirculation.

Vapor, at the rate of 475,000 Nm.³/h. exits the separator 138 through the conduit 143 and is compressed to a pressure of 107 atma. and temperature of 588° K. in the compressor 144. The vapor is then condensed in the condenser-evaporator 136 and the condensate exits at a rate of 100,000 gal./hr., temperature of 585° K. and pressure of 107 atma. 6,000 gal./hr. of this condensate is drawn off in the branched conduit 151 for reevaporation in the additional heater and transmission to the conduit 145 at a temperature of 588° K. and pressure of 107 atma. The remaining condensate is cooled in the heat exchanger 131 to a temperature and pressure of 320° K. and at 107 atma. and engine-expanded to a pressure and temperature of 1.1 atma. and 320° K. in the turbine 148 for flow to the reservoir at the above-mentioned rate of 100,000 gal./hr.

A flow of fresh water of 90,000 gal./hr. through the conduit 158 is achieved by heating vapor supplied at 363° K., 1.2 atma., at a rate of 90,000 gal./hr. from the conduit 117 to a temperature and pressure of 700° K. and 1.2 atma. in the reheater 154, drawing off 45,000 gal./hr. of this stream for circulation through the additional heater 152 and then passing the recombined vapor through the heat exchanger 131 at a temperature and pressure of 650° K. and 1.2 atma. for cooling to a temperature of 363° K. prior to entry into the final condenser 157.

It has been found that for the above exemplary composition of an oil saline water concentration of 2 to 3 percent added through the metering pump 170 is suitable in preventing incrustation; however, depending on solids concentration, operating temperatures and the like, the oil addition in the range of 0.0015 to 0.0036 gal. per gallon saline water may be found necessary.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. A process for obtaining fresh water from saline water comprising the steps of
   introducing saline water into an evaporation chamber;
   simultaneously directing a hot pressurized gaseous stream into said chamber to evaporate said saline water and generate a vapor phase and precipitate therefrom;
   subjecting said vapor phase to a postwashing step with fresh water to remove salt particles therefrom;
   separately withdrawing said gas-vapor phase and said precipitate from said chamber;
   engine expanding said gas-vapor phase in at least one stage; and
   cooling the expanded gas-vapor phase to condense out fresh water.

2. A process according to claim 1 wherein said vapor phase is superheated to a temperature of about 500 to 900 and preferably 600 to 800° K. before at least one of said expansion stages.

3. A process according to claim 1 wherein said gaseous stream consists of the cycle cooling gas from an atomic reactor.

4. A process according to claim 1 wherein said gaseous stream consists of the cycle gas from a closed gas turbine plant.

5. A process according to claim 1 wherein said gaseous stream consists of exhaust gases from an open gas turbine.

6. A process according to claim 1 wherein the required temperature level is maintained in said evaporation chamber by introducing the fresh water therein through nozzles at a rate of about 3 to 12 and preferably 4 to 8 gal./hr. per 100 gal./hr. sea water.

7. A process according to claim 1 wherein said vapor phase is superheated to a temperature of about 500 to 900 and preferably 600 to 800° K. immediately following evaporation.

8. A process according to claim 1 wherein said vapor phase is introduced into a second evaporation chamber having a controlled water feed after said first evaporation chamber.

9. A process according to claim 1 wherein said gaseous stream is introduced at a pressure of about 20 to 100, preferably 30 to 60 atma.

10. A process according to claim 9 wherein said gaseous stream is introduced at a temperature of about 1,000 to 3,000, preferably 1,500 to 2,000° K.

11. A process according to claim 1 wherein said gaseous stream consists of combustion gases from pressurized combustion of carbonaceous fuels.

12. A process according to claim 11 wherein said combustion is conducted externally of said evaporation chamber, the gases produced by said combustion being transmitted to said evaporation chamber under pressure.

13. A process according to claim 1 wherein condensation of said expanded vapor is accomplished in two stages and wherein the vapor condensate produced in the first of said stages is utilized for postwashing said vapor.

14. A process according to claim 13 wherein at least the last stage of said condensation is ventilated in order to drive off incondensable gases.

15. A process according to claim 1 wherein said vapor phase is superheated before expansion thereof by heat exchange with a portion of said hot gaseous stream.

16. A process in accordance with claim 15 wherein the transfer of heat between said gaseous stream and said vapor phase is accomplished indirectly through a heat transfer medium.

17. A process for obtaining fresh water from saline water, comprising the steps of:
   subjecting saline water to partial evaporation in a first saline water evaporator, separating the vapors and introducing a portion of the thus-concentrated resultant liquid into a second evaporation chamber;
   compressing the vapors from said first evaporator to serve as a heating medium in said first evaporator;
   simultaneously directing a hot pressurized gaseous stream into said second chamber to evaporate said portion of liquid and generate a vapor phase and a precipitate therefrom;
   separately withdrawing said gas-vapor phase and said precipitate from said second chamber;
   engine expanding said gas-vapor phase in at least one stage;
   utilizing the energy produced by said engine expansion of the gas-vapor phase for compressing the vapors separated in said vapor separator; and
   cooling the expanded gas-vapor phase to condense out fresh water.

18. A process according to claim 17 wherein the saline water is enriched in salt content in said separate evaporator prior to introduction into said evaporation chamber.

19. A process according to claim 17 wherein the saline water is prewarmed in heat exchange relationship with vapor condensate from said separate evaporator and a reheated residual vapor from a condensation stage of said expanded vapor, enriched with salts in a condenser-evaporator prior to introduction into said vapor separator, a portion of the precipitate from said vapor separator being introduced directly into said evaporation chamber.

20. A process according to claim 19 wherein a portion of the vapor condensate of said separate evaporator is reevaporated by reheating and returned to said condenser-evaporator as the heating medium therefor.

21. A process according to claim 19 wherein said residual vapor is reheated by heat transfer with a portion of said hot gaseous stream.

22. A process in accordance with claim 21 wherein the transfer of heat between said gaseous stream and said expanded vapor is accomplished indirectly through a heat transfer medium.

23. A process according to claim 20 wherein said vapor condensate portion is reheated by heat transfer with a portion of said hot gaseous stream.

24. A process in accordance with claim 23 wherein the transfer of heat between said vapor condensate portion and said hot gaseous stream is accomplished indirectly through a heat transfer medium.

25. A process according to claim 24 wherein said heat transfer medium comprises a portion of the reheated vapor from said first condensation stage.

26. A process according to claim 17 wherein an oil having a strong affinity to metallic surfaces, minimum solubility in water, minimum solubility for salts contained in the saline water, and minimum vapor pressure is admixed in the saline water prior to heat exchange thereof in said separate evaporator.

27. A process according to claim 26 wherein said oil is separated at least partially from the saline water prior to introduction thereof into said evaporation chamber.

28. A process according to claim 27 wherein the residual oil contained in the saline water introduced into said evaporation chamber is afterburned therein by providing an excess of oxygen thereto.

29. An apparatus for obtaining fresh water from saline water comprising a substantially vertical evaporation chamber, means to supply a hot gaseous stream under pressure, laterally to the lower section of said chamber, means to controllably introduce saline water through first nozzles in the upper section of said chamber to produce a vapor phase and a precipitate by direct contact of the saline water with the hot gaseous stream under pressure, additional nozzle means disposed above said first nozzles in said evaporation chamber to introduce fresh water for postwashing said vapor phase, and exhaust conduit for said vapor phase communicative with the uppermost section of said evaporation chamber, at least one turbine and an intermediate superheating unit communicative with said conduit for engine expanding said vapor phase, at least one condenser communicative with the exhaust of said turbine for condensation of turbine exhaust vapor into fresh water and separation of gas from the expanded vapor, and at an outlet pipe at the lower section of said evaporation chamber for the control discharge of said precipitate.

30. An apparatus according to claim 29 wherein baffle means are disposed in said evaporation chamber below said additional nozzle means for improving the washing effect thereof.

31. An apparatus according to claim 29 wherein a second evaporation chamber with controllable fresh water nozzles is communicative with the outlet of the first-mentioned of said evaporation chambers.

32. An apparatus according to claim 29 wherein a superheater is communicative with said exhaust conduit.

33. An apparatus according to claim 32 wherein said superheater is heated by a partial stream from said hot gaseous stream.

34. An apparatus according to claim 40 wherein means are provided for improving the degassing step in the last stage of said condenser.

35. An apparatus according to claim 34 wherein said means for improving the degassing step comprise an additional column connected after the last stage of said condenser.

36. An apparatus according to claim 29 further including a separate saline water evaporator comprising a heat exchanger, conduit means communicating said heat exchanger with a source of saline water and the evaporator flow path of a condenser-evaporator, a vapor separator communicative with the evaporator flow path of said condenser-evaporator, a vapor exhaust conduit in said vapor separator, a compressor communicative with said vapor exhaust conduit, and means communicating the exhaust from said compressor to the condenser flow path of said condenser-evaporator to be condensed therein and means coupling said turbine with said compressor to provide drive therefor.

37. An apparatus according to claim 36 further including a saline water pump wherein one flow path of said heat exchanger transmits flow between said saline water pump and said condenser-evaporator; said vapor separator further having a discharge conduit for enriched brine communicative with an evaporator cycle conduit through the evaporator flow path of said condenser-evaporator and through said separator, a branch-off conduit means from said cycle conduit downstream of said separator including a control valve providing communication between the cycle discharge conduit of said separator and said first nozzles.

38. An apparatus in accordance with claim 37 wherein means are provided to communicate a second flow path of said heat exchanger with the discharge condensate flow path of said condenser-evaporator, an expansion turbine communicative with said second flow path downstream of said heat exchanger, and a fresh water reservoir communicative with the exhaust of said expansion turbine and wherein said condenser comprises two condenser stages, a third flow path of said heat exchanger carrying the vapor from a first of said condenser stages, through the heat exchange through a reheater in said third flow path between said heat exchanger and said first condenser stage, through the heat exchanger, through the second of said condenser stages communicative with said third flow path downstream of said heat exchanger and the condensate from the second of said condenser stages exhausting into said fresh water reservoir.

39. An apparatus according to claim 37 wherein an oil storage tank and a metering pump are communicative with the conduit means 129 between said saline water pump and said heat exchanger.

40. An apparatus according to claim 29 wherein said condenser is constructed in at least two stages, a condensate pump communicative with the first of said stages for conveying the condensate therefrom to said additional nozzle means.

41. An apparatus according to claim 40 further comprising a heat exchanger, means to transmit flow from said condensate pump to said additional nozzle means through one flow path of said heat exchanger, and means transmitting flow between the exhaust of said turbine and said condenser through the other flow path of said heat exchanger.

42. An apparatus according to claim 40 wherein at least the last stage of said condenser is provided with air inlet and outlet conduits to purge incondensable gases therefrom.

UNITED STATES PATENT OFFICE
CERTIFICATE OF CORRECTION

Patent No. 3,557,863  Dated January 26, 1971

Inventor(s) RUDOLF BECKER

It is certified that error appears in the above-identified patent and that said Letters Patent are hereby corrected as shown below:

Column 7, Line 69, change "closed gas" to ---closed cycle gas---

Column 10, Line 37, delete "through the heat exchange"

Signed and sealed this 1st day of June 1971.

(SEAL)
Attest:

EDWARD M. FLETCHER, JR.
Attesting Officer

WILLIAM E. SCHUYLER, JR.
Commissioner of Patents